United States Patent [19]
Andrew et al.

[11] Patent Number: 5,964,141
[45] Date of Patent: Oct. 12, 1999

[54] COFFEEMAKER

[75] Inventors: Michael A. Andrew, Milford, Conn.; Walter G. Birdsell, Marlborough, Mass.

[73] Assignee: HP Intellectual Corp., Wilmington, Del.

[21] Appl. No.: 09/058,245

[22] Filed: Apr. 10, 1998

[51] Int. Cl.⁶ ................................................. A47J 31/24
[52] U.S. Cl. .................................. 99/280; 99/299; 99/307
[58] Field of Search ........................... 99/280, 295, 299, 99/304, 307, 306

[56] References Cited

U.S. PATENT DOCUMENTS

| | | | |
|---|---|---|---|
| 4,467,707 | 8/1984 | Amiot | 99/279 |
| 4,811,657 | 3/1989 | Rixen | 99/295 |
| 4,833,978 | 5/1989 | Martone et al. | 99/280 |
| 4,893,552 | 1/1990 | Wunder et al. | 99/299 |
| 4,924,922 | 5/1990 | Johnson | 141/346 |
| 5,133,247 | 7/1992 | Pastrick | 99/295 |
| 5,231,918 | 8/1993 | Grzywna | 99/295 |
| 5,485,778 | 1/1996 | Ullmann | 99/295 |
| 5,503,060 | 4/1996 | Morecroft et al. | 99/295 |
| 5,515,771 | 5/1996 | Smit | 99/280 |

FOREIGN PATENT DOCUMENTS

| | | |
|---|---|---|
| 0019291 | 11/1980 | European Pat. Off. . |
| 2732053 | 2/1979 | Germany . |

*Primary Examiner*—Reginald L. Alexander
*Attorney, Agent, or Firm*—Barry E. Deutsch

[57] ABSTRACT

A coffeemaker (30) includes a lower housing (32) and an upper housing (34). A water reservoir (44) sets atop a portion of the lower housing (32). A top cover (56) extends in cantilever from the upper housing (34). A brew basket holder (58) is mounted pivotally to the upper housing (34) and contains a brew basket (76), having a brewed-beverage outlet (88), and a filter (78). When the coffeemaker (30) is in use, the holder (58) is located beneath the top cover (56). A releasable latch unit (62) is employed to retain the holder (58) in this. As a carafe (64) is placed in the coffeemaker (30), an actuator (132) is moved by the carafe to operate a switch (130), whereafter, upon operation of a control switch by a user, the coffeemaker (30) will process through a beverage brewing cycle. When the actuator (132) moves, the outlet (88) is opened to allow the flow of the beverage to the carafe (64). The actuator (132) is formed with a belly section (134) for collecting any drops of the brewed beverage as the carafe (34) is being removed and the outlet (88) is being closed.

16 Claims, 15 Drawing Sheets

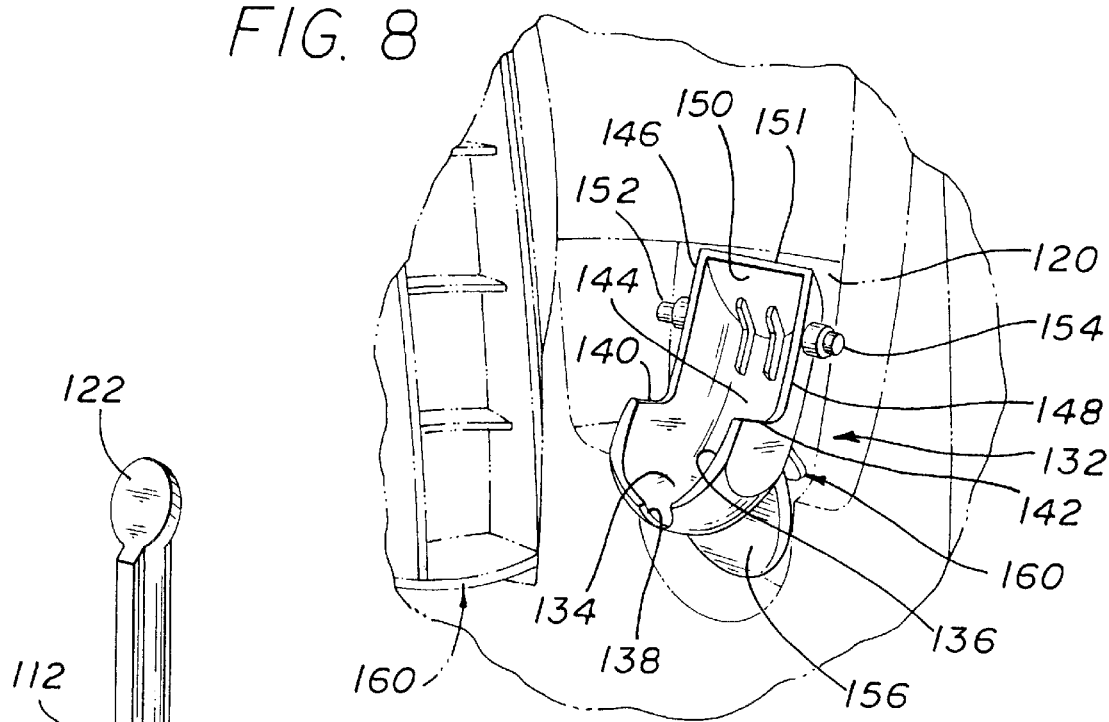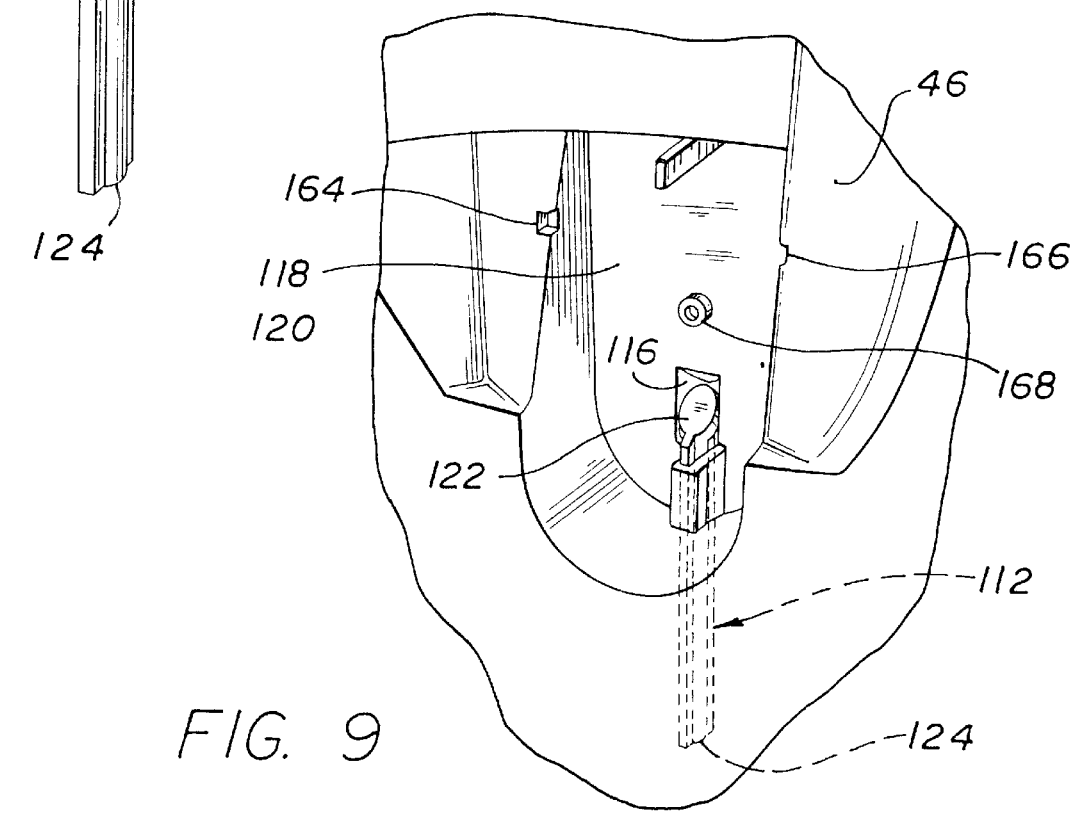

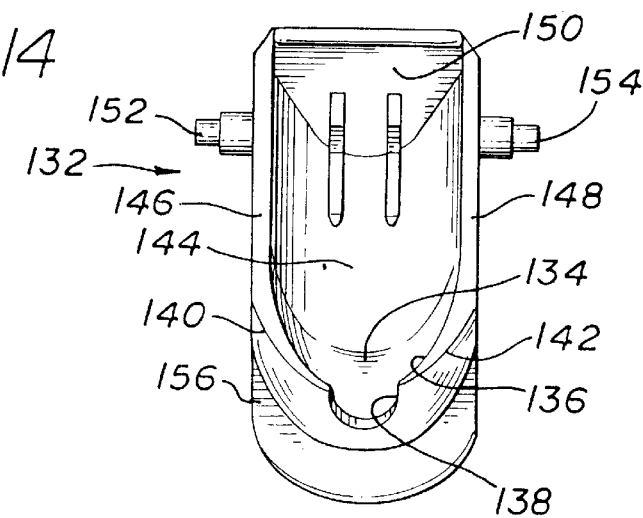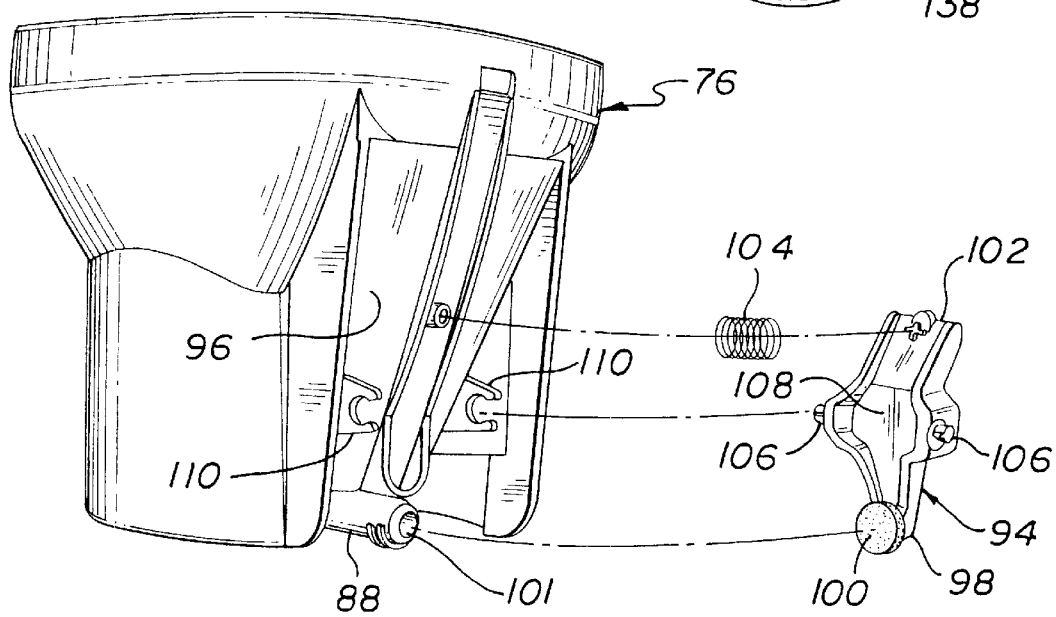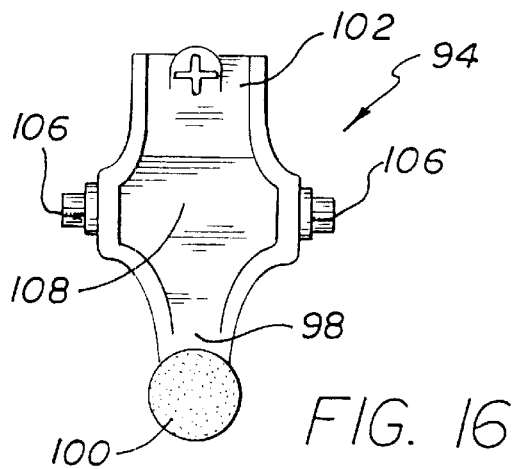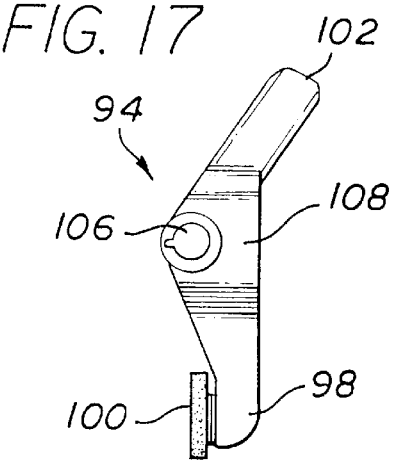

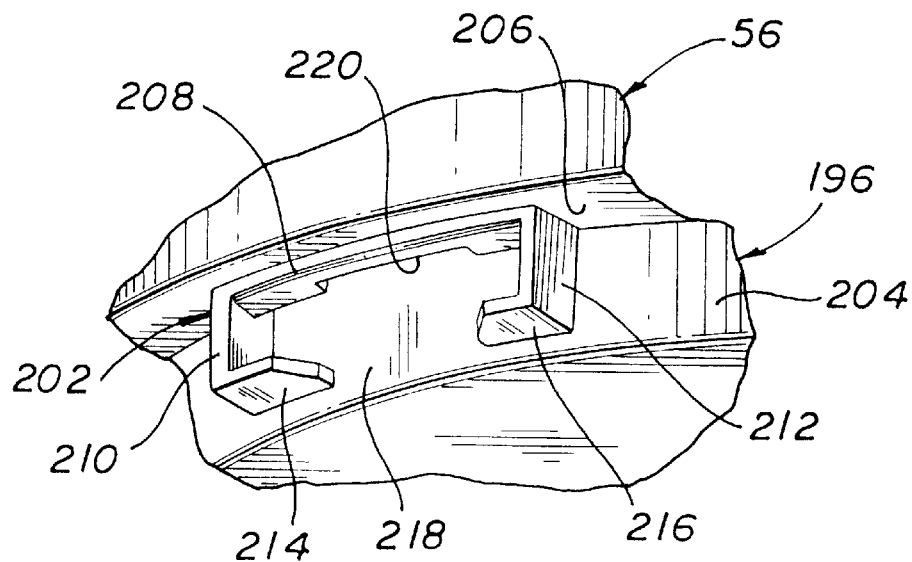
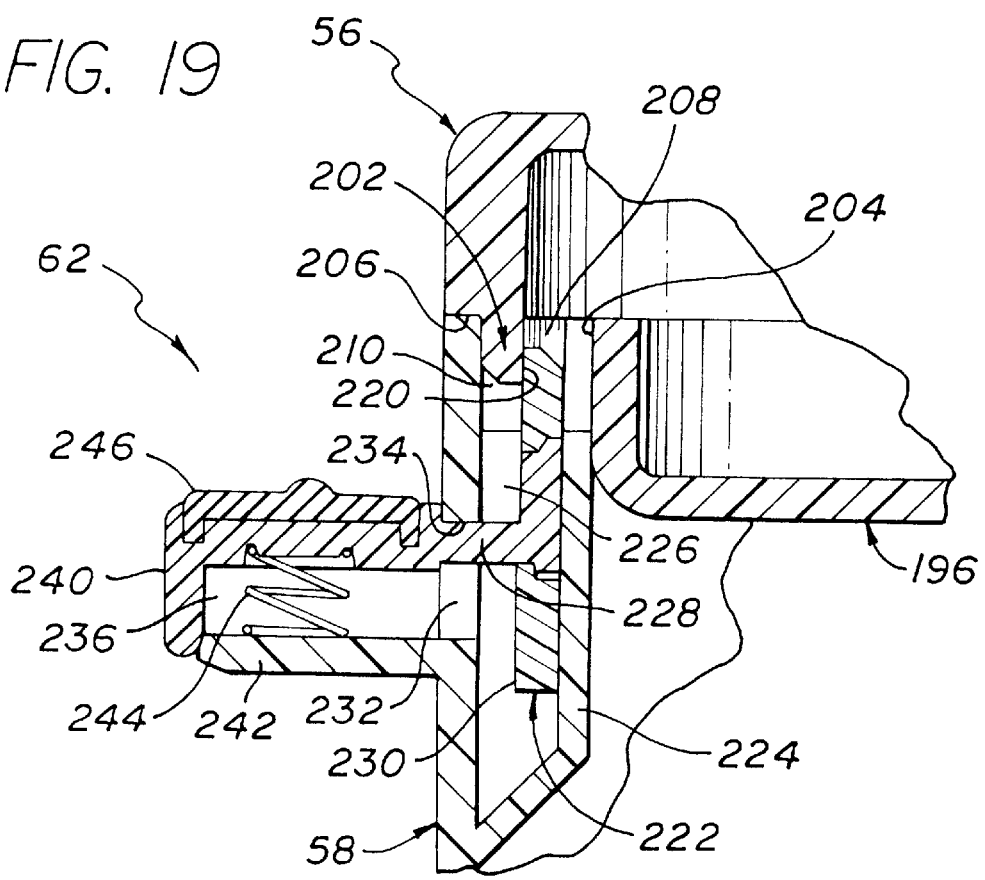

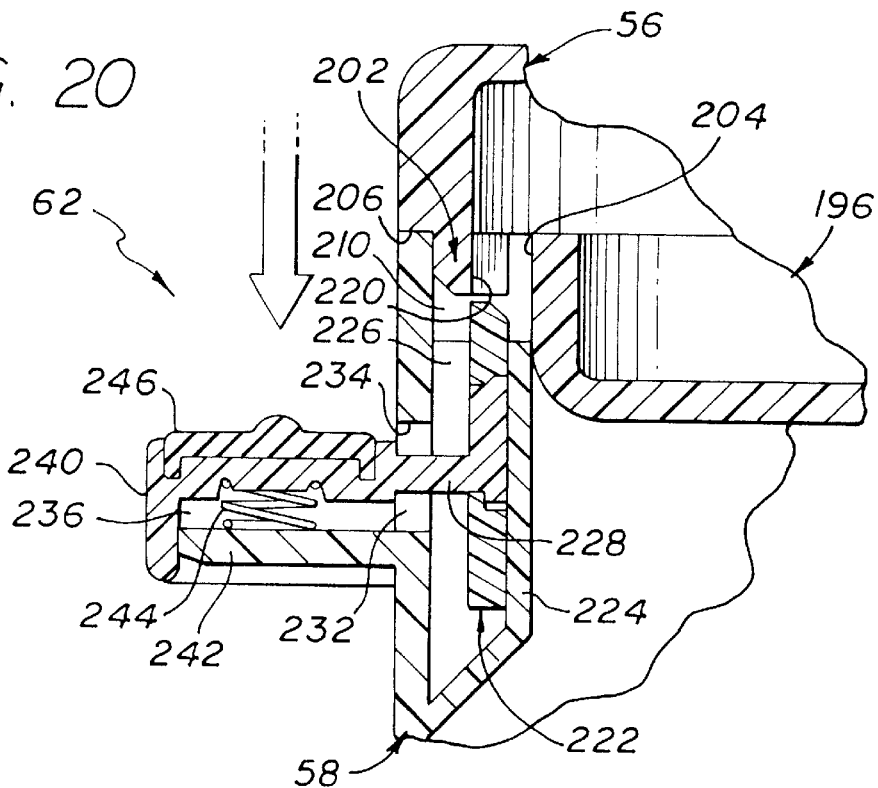
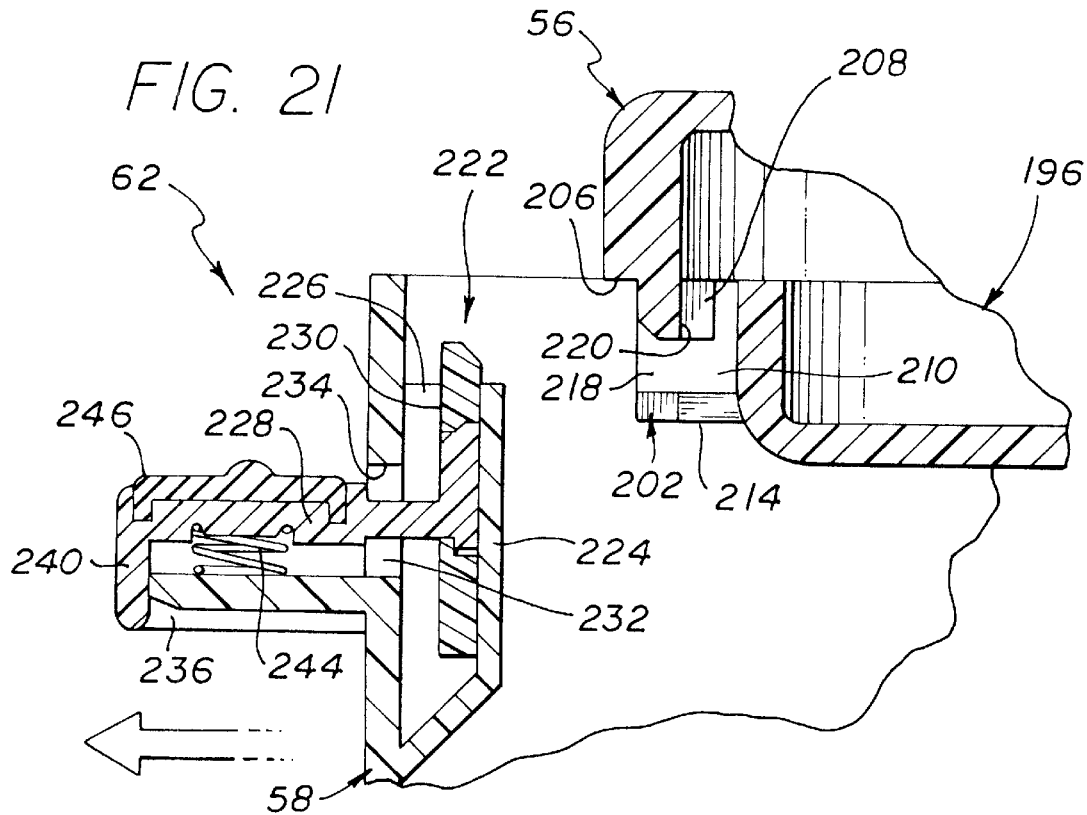

COFFEEMAKER

BACKGROUND OF THE INVENTION

This invention relates to a coffeemaker and particularly relates to a coffeemaker having facility for brewing coffee and dispensing the brewed coffee directly into a carafe.

Some coffeemakers include a water reservoir, a brew basket with a filter, a holder for containing the brew basket and the filter, a water heating system, a conduit system for feeding heated water to the brew basket, and a facility for dispensing brewed coffee from the brew basket to a coffee pot or carafe.

Typically, the holder must be withdrawn in some fashion to facilitate the deposit of ground coffee, for example, into the filter in preparation for a coffee-brewing procedure. The holder is then returned to its coffee-brewing position in the coffeemaker. In the coffee-brewing position, the holder, brew basket and filter must be retained in a specific location within the coffeemaker during the coffee-brewing process.

Some coffeemakers include facility for attaching the holder to adjacent portions of the coffeemaker to effect the retention of the holder, basket and filter in its proper location. However, in some instances, the attaching facility is difficult to access or operate.

Therefore, there is a need for a latching unit which is user friendly and which firmly secures the holder, with the basket and filter, in place for the coffee-brewing process.

In the operation of coffeemakers, it is critically important that all elements of the coffeemaker, including the carafe, be in place prior to initiation of the brewing process. To insure that the carafe is in place, a carafe-sensing facility is used which prohibits the operation of the coffeemaker in the event that the carafe is not in place.

During the brewing process, the brewed coffee is dispensed from the brew basket through an outlet and into the carafe. To insure that brewed coffee is not dispensed when the carafe has been removed from the coffeemaker, a shut-off facility is often employed.

Typically, the sensing facility and the shut-off facility are structured such that considerable space is required for the two facilities within the coffeemaker.

Consequently, there is a need for a combined facility which operates in a timely fashion, and efficiently, to effect the sensing and the shut-off operations, while requiring a relatively small amount of space within the coffeemaker.

During the period when the beverage-containing carafe is being removed from the coffeemaker, and for an instant thereafter, a few drops of brewed coffee may be released at the outlet of the brew basket. In some coffeemakers, a drip collector is provided for this purpose. Again, such a device requires space within the coffeemaker, thereby resulting in a relatively larger coffeemaker.

Thus, there is a need for a coffeemaker which includes a drip collector requiring limited space for the efficient collection of a small amount of brewed coffee which may be released from the outlet of the brew basket as the outlet is being sealed.

SUMMARY OF THE INVENTION

Therefore, it is an object of this invention to provide a coffeemaker with a user-friendly and efficient latching unit for latching a brew basket holder to adjacent structure of the coffeemaker.

Another object of this invention is to provide a coffeemaker which senses the presence, or absence, of a carafe in the coffeemaker to allow, or prohibit, operation of the coffeemaker by a user.

A further object of this invention is to provide a coffeemaker having a sealing facility for allowing the dispensing of brewed coffee from a brew basket into a properly placed carafe, or precluding the dispensing of brewed coffee from the brew basket during the absence of the carafe.

Still another object of this invention is to provide a coffeemaker having facility for collecting any brewed coffee which may drip from an outlet of a brew basket.

An additional object of this invention is to provide a coffeemaker which requires limited space for containing facilities which (1) sense the presence of a carafe to allow, or absence of the carafe to preclude, operation of the coffeemaker, (2) seal an outlet of a brew basket in the absence of the carafe, and/or (3) collect drops of brewed coffee from the brew basket outlet in the absence of the carafe.

With these and other objects in mind, this invention contemplates a coffeemaker which includes a housing, a nest for receiving a carafe therein, and a brew basket which is formed with an outlet for directing the outbound flow of a brewed beverage therefrom. The coffeemaker further includes a drip collector responsive to the absence of the carafe in the nest for collecting therein any of the brewed beverage which may be dispensed through the outlet, and responsive to the carafe being in the nest for moving the drip collector to allow the brewed beverage which flows from the outlet to be directed to the carafe.

This invention additionally contemplates a coffeemaker which includes a housing, a holder, and a brew basket located within the holder and having an outlet for a beverage within the basket. The coffeemaker also includes a nest extending from the housing for receipt of a carafe, a movable actuator mounted within the housing, and a lever mounted on the brew basket in a location accessible for engagement by the actuator. A fluid flow seal is attached to the lever and is positioned to normally cover the outlet. When the carafe is not located in the nest, the lever is biased to move the seal to its normal position over the outlet to preclude beverage flow from the brew basket. When the carafe is located in the nest, the actuator is moved by the carafe to engage and move the lever to thereby move the seal from the outlet to allow beverage to flow from the brew basket.

This invention also contemplates a coffeemaker which includes a housing, a nest extending from the housing for receipt of a carafe, a movable actuator mounted within the housing, and a switch contained within the housing, the actuation of which is necessary for the eventual operation of the coffeemaker. When the carafe is positioned in the nest, the carafe engages and moves the actuator which results in the actuation of the switch to condition the coffeemaker for eventual operation by a user.

This invention further contemplates a coffeemaker which includes a housing having an extension, and a holder attached movably to the housing adjacent the extension. The coffeemaker further includes a latch unit having a catch formed on the extension and a latch bar attached for limited movement to the holder. The latch bar includes an extension which extends externally of the holder and which is movable against the action of a biasing element. When the holder is moved to a coffee-brewing position, the latch bar is biasingly movable to locate within the catch to firmly attach the holder to the extension and, thereby, to the housing.

Other objects, features and advantages of the present invention will become more fully apparent from the following detailed description of the preferred embodiment, the appended claims and the accompanying drawings.

BRIEF DESCRIPTION OF THE DRAWINGS

In the accompanying drawings:

FIG. 8 is a partial perspective view showing a cradle actuator which forms a portion of the coffee dispensing facility of FIG. 2 in accordance with certain principles of the invention;

FIG. 9 is a perspective view showing a switch-actuating rod in a rod mount in accordance with certain principles of the invention;

FIG. 10 is a perspective view showing the switch-actuating rod of FIG. 9 in accordance with certain principles of the invention;

FIG. 14 is a front view showing the cradle actuator of FIG. 8 in accordance with certain principles of the invention;

FIG. 15 is a partial exploded perspective view showing the brew basket of FIG. 4 and a pivotable stopper in accordance with certain principles of the invention;

FIG. 16 is a front view showing the pivotable stopper of FIG. 15 in accordance with certain principles of the invention;

FIG. 17 is a side view showing the pivotable stopper of FIG. 15 in accordance with certain principles of the invention;

FIG. 18 is a partial perspective view showing a latch bar of the latching facility of FIG. 4 in accordance with certain principles of the invention;

FIG. 19 is a sectional view showing the latching facility of FIG. 4 in latching engagement with the lid and the brew basket holder of FIG. 4 in accordance with certain principles of the invention;

FIG. 20 is a sectional view showing the latching facility of FIG. 19 in unlatched disengagement between the lid and the brew basket holder of FIG. 4 in accordance with certain principles of the invention;

FIG. 21 is a sectional view showing the latching facility of FIG. 19 in unlatched disengagement between the separated lid and the brew basket holder of FIG. 4 in accordance with certain principles of the invention;

DETAILED DESCRIPTION OF THE PREFERRED EMBODIMENTS OF THE INVENTION

Figure 1:
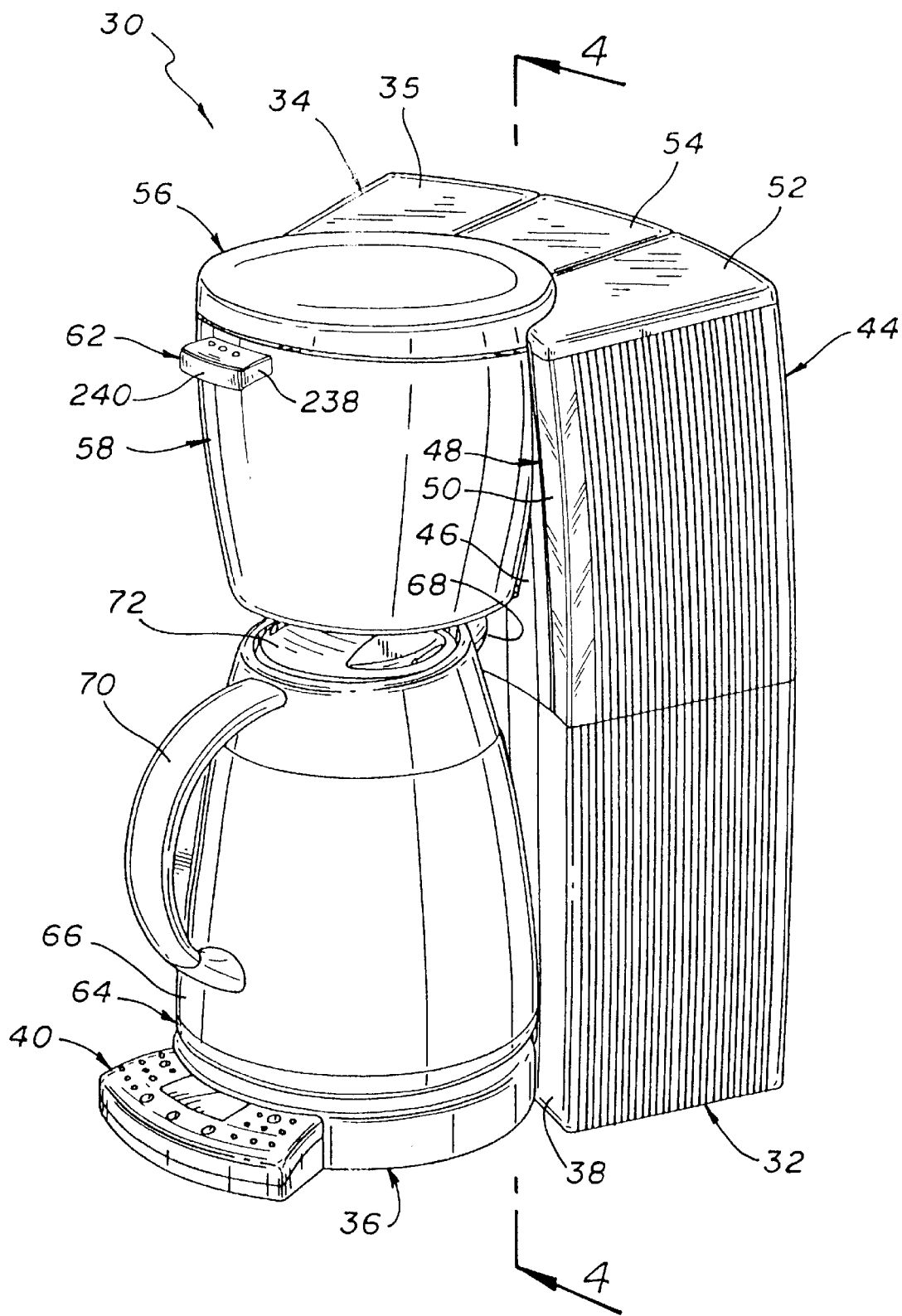
FIG. 1 is a perspective view showing a coffeemaker.
Figure 3:
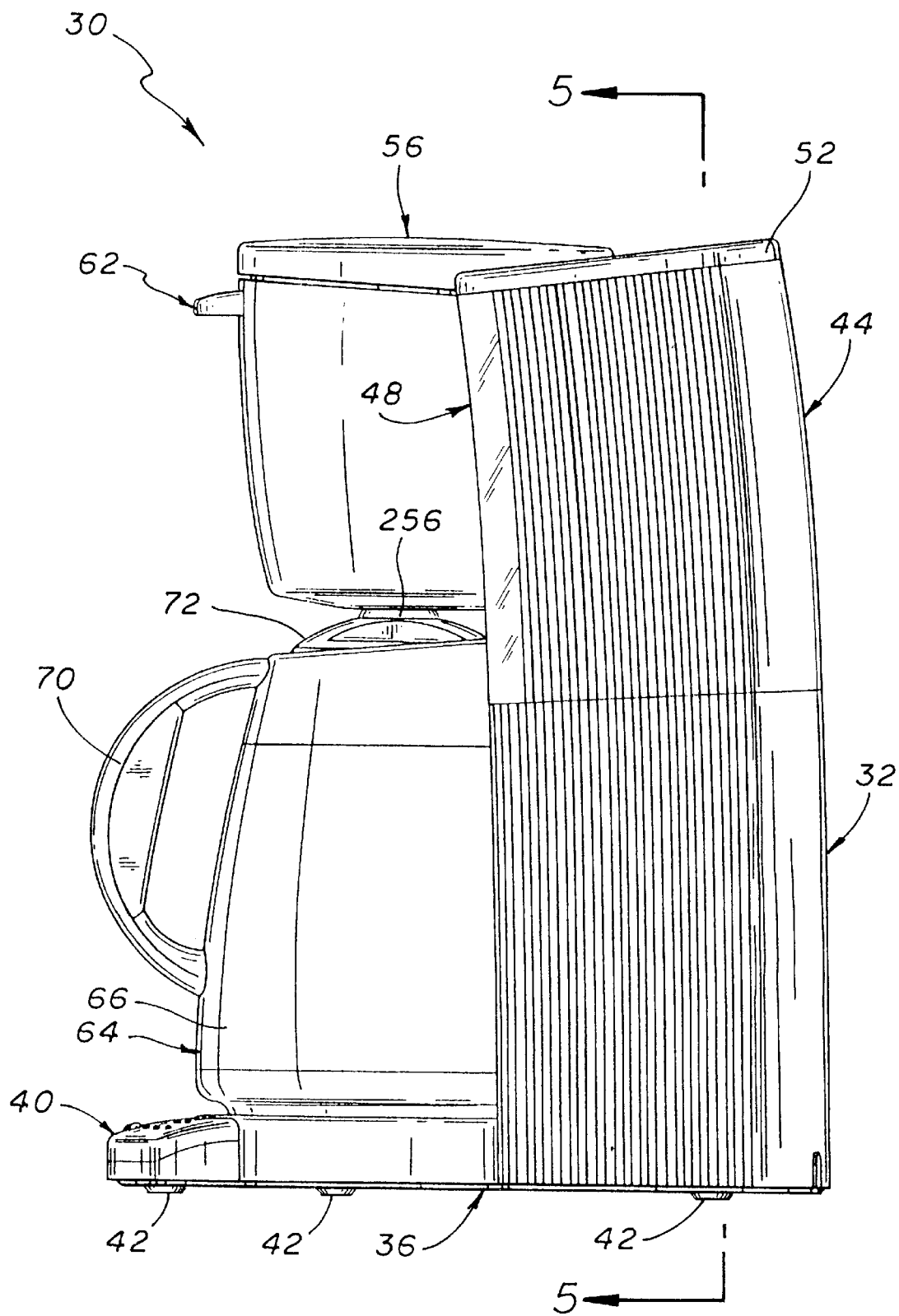
FIG. 3 is a side view showing the coffeemaker of FIG. 1.

As shown in FIGS. 1 and 3, a coffeemaker 30 includes a lower housing 32 and an upper housing 34 formed with a top cover 35. A base 36 extends outward from a lower front wall 38 of the lower housing, and a control panel 40 extends forward of a lower portion of the front of the base. The bottoms of the lower housing 32, the base 36 and the control panel 40 are in a common plane and have a plurality of compliant feet 42 (FIG. 4) attached thereto.

A water reservoir 44 sets atop a portion of the lower housing 32 behind an upper front wall 46 of the upper housing 34. The water reservoir 44 is formed with water sight window 48 having a vertical scale (not shown) thereon to provide an indication of the level of the water in the reservoir at any given time. A front portion 50 of the sight window 48 is adjacent and flush with the upper front wall 46 of the upper housing 34. The water reservoir 44 is formed with a fixed cover 52 which covers a portion of the top of the reservoir, and a pivotable lid 54 which removably covers the remaining portion of the top of the reservoir. The lid 54 can be selectively pivoted to provide an opening for the dispensing of water into the reservoir 44.

A generally circular top cover 56 of the coffeemaker 30 extends in cantilever from the top of the upper front wall 46 of the upper housing 34, with the upper front wall at the juncture with the top cover being curved to conform to the adjacent circular shape of the top cover. A brew basket holder 58 is formed with a support brace 60 (FIG. 2) which is mounted to the upper housing 34 for pivoting movement relative thereto. When the coffeemaker 30 is not in use, or coffee is being brewed therein, the holder 58 is located beneath the top cover 56 as shown in FIG. 1. A releasable latch unit 62 is employed to retain the holder 58 in the position beneath the top cover 56 during a non-use period and during a coffee brewing period.

Figure 2:
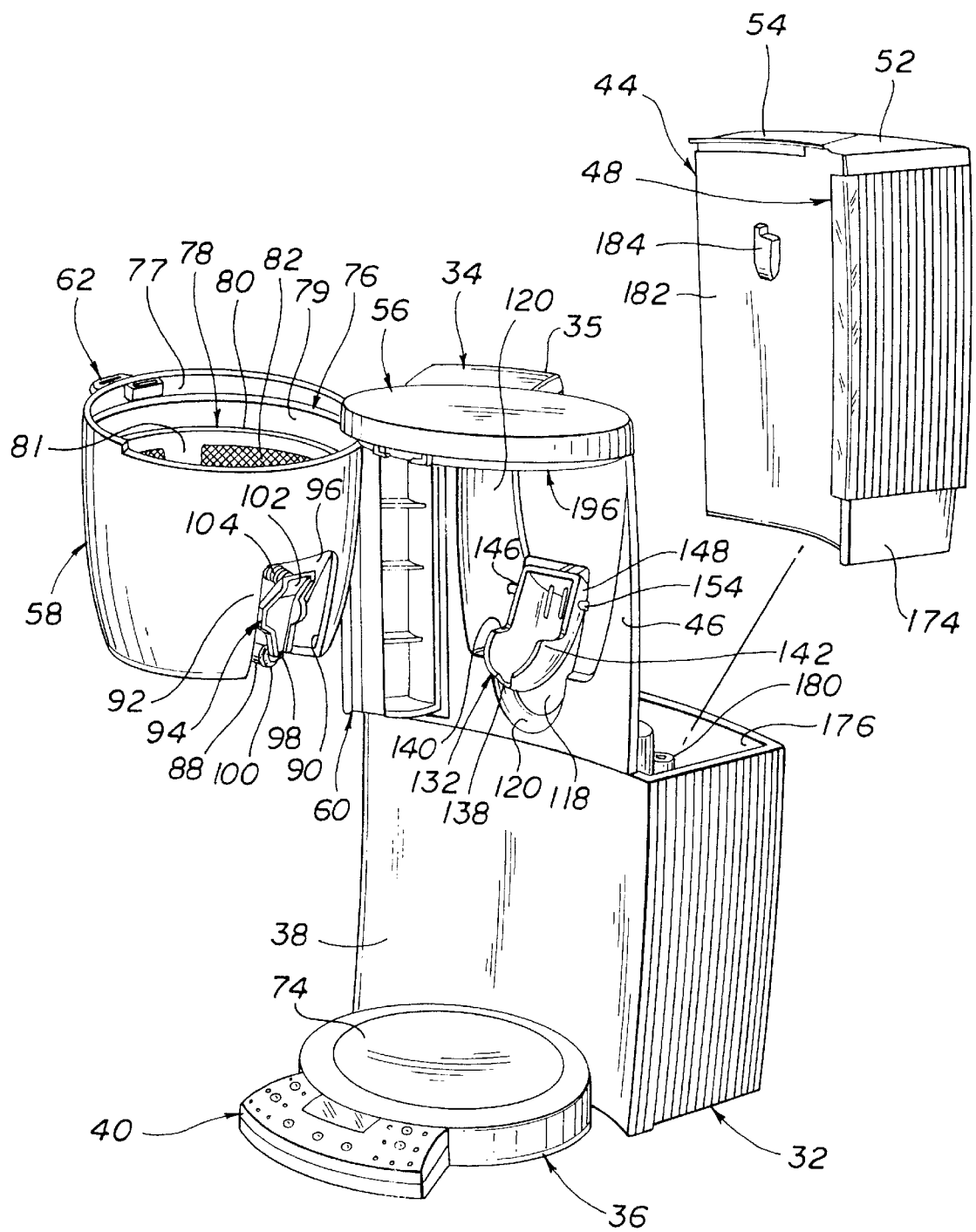
FIG. 2 is a partial exploded perspective view of the coffeemaker of FIG. 1 showing a water reservoir, and a coffee dispensing facility in accordance with certain principles of the invention.

A carafe 64 is situated on the top of the base 36, and includes a double-wall container 66, a pouring spout 68, a handle 70 attached to the container and a push-to-pour lid 72. As shown in FIG. 2, the base 36 is formed with a concave nest 74 for receipt of the bottom of the carafe 64.

Figure 4:
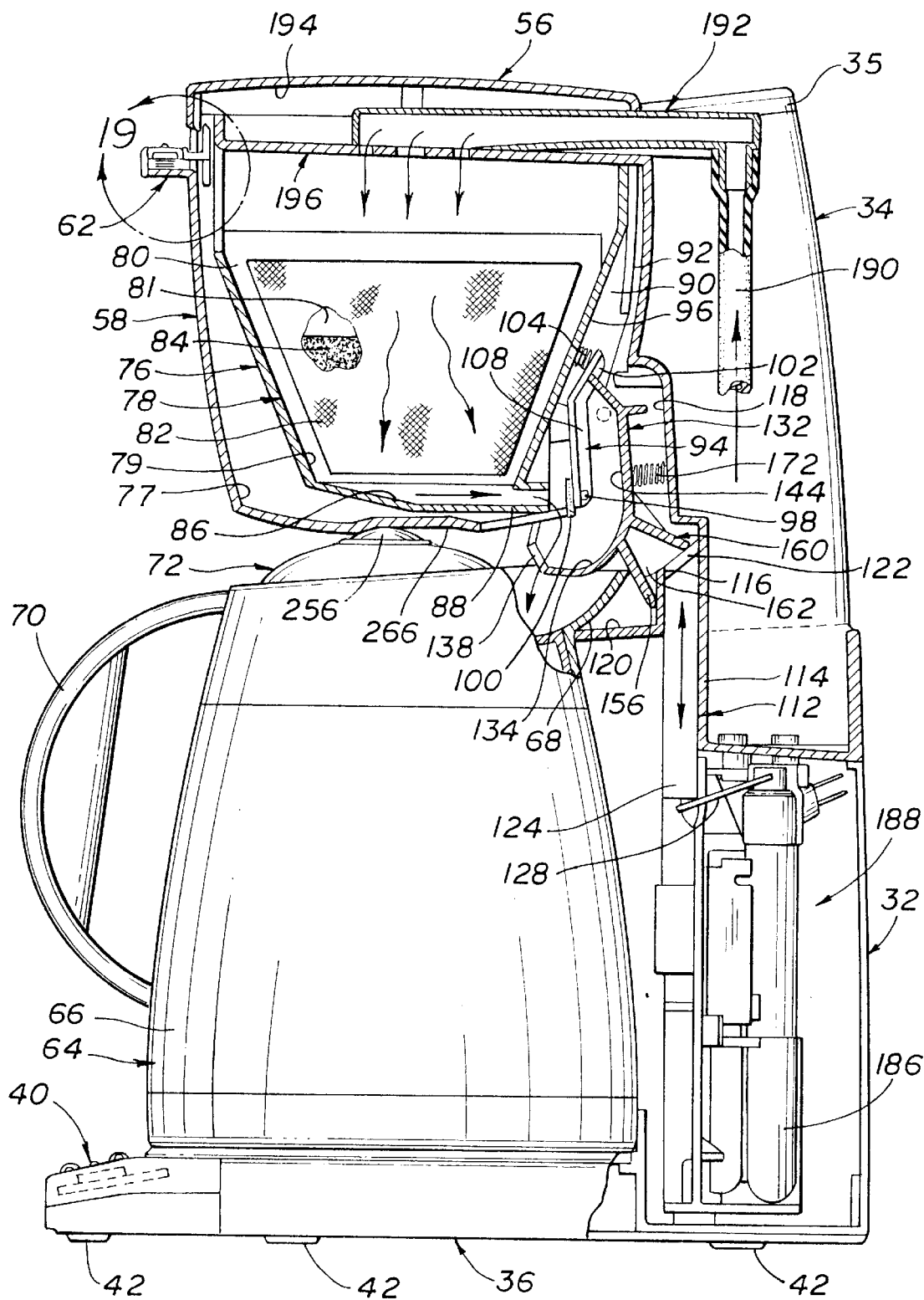
FIG. 4 is a side view with parts broken away of the coffeemaker of FIG. 1 showing a latching facility for a lid of a brew basket holder, a brew basket, and the coffee dispensing facility of FIG. 2, all in accordance with certain principles of the invention.

Referring to FIGS. 2 and 4, a brew basket 76 is located within an inner well 77 of the holder 58, which is open at the top thereof. A reusable filter 78 is located within a well 79 of the basket 76 which is open from the top thereof. The filter 78 includes a well 81 which is open at the top thereof. The filter 78 is formed by a plastic frame 80 which supports a fine mesh screen 82 allowing the brewed beverage to pass therethrough. The screen 82 retains ground coffee 84 (FIG. 4) within the filter 78, prior to, during and after the making of the brewed coffee beverage. A trough 86 (FIG. 4) is formed in the bottom of the brew basket 76 and communicates with a tubular outlet 88. The holder 58 is formed with a large recess 90 (FIG. 24) in a side wall 92 thereof which provides a passage for the tubular outlet 88 to the exterior of the holder 58.

Referring to FIGS. 2, 4, 6, 7 and 15, a lever 94 is mounted to a exterior side wall 96 of the basket 76 for pivotal movement about a central section of the lever. A first end 98 of the lever 94 supports a compliant stopper 100 which faces an open end 101 of the tubular outlet 88. A second end 102 of the lever 94 is biased outward by a spring 104 located between the side wall 96 and the inward face of the lever, which normally pivots or rocks the lever to press the stopper 100 over the opening of the tubular outlet 88. As further shown in FIGS. 2, 4, 15, 16 and 17, the lever 94 is formed with two pins 106 which extend laterally outward from opposite sides of a central section 108. The pins 106 seat in pin receptors 110 (FIG. 15) formed on the exterior side wall 96 of the basket 76.

Figure 6:
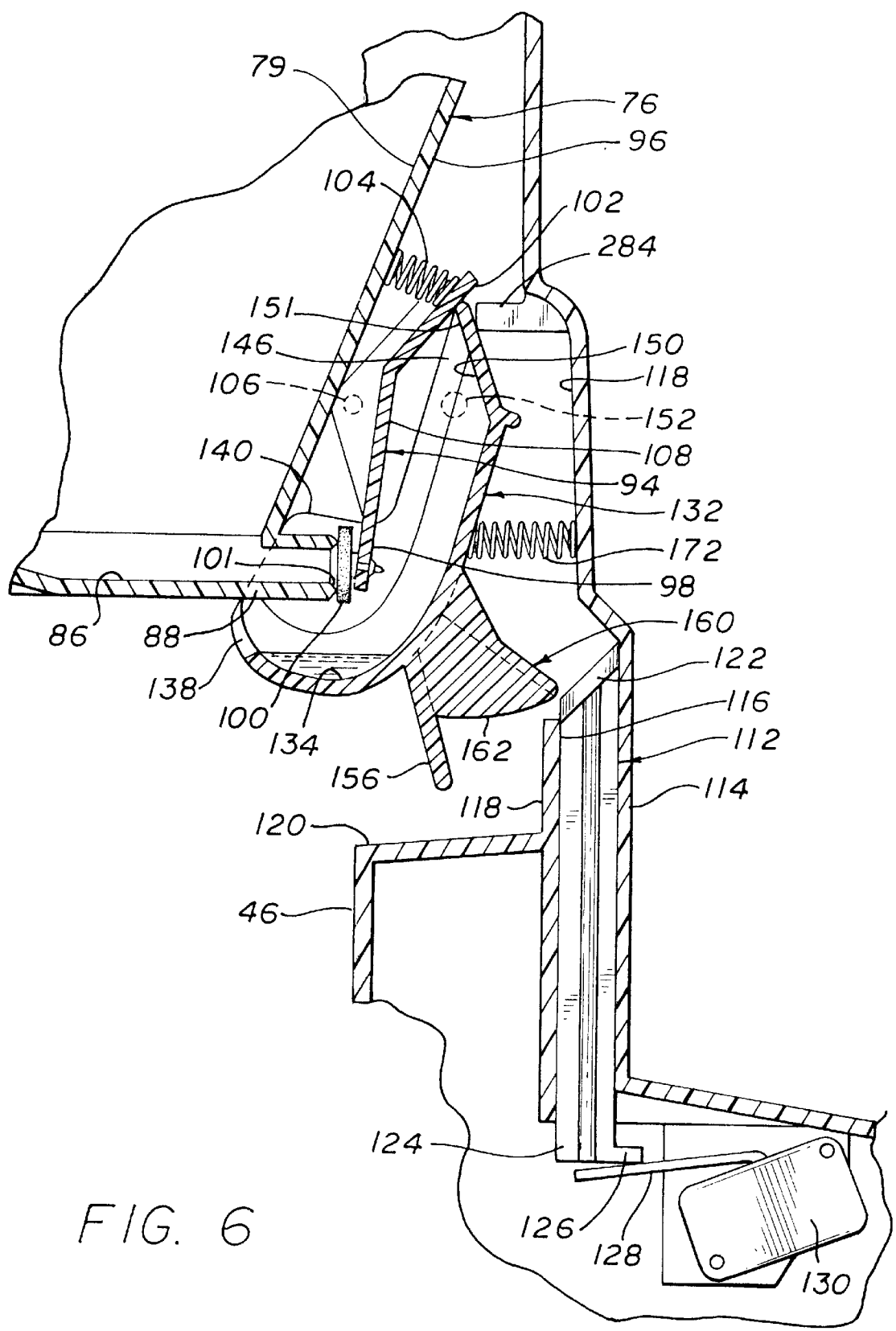
FIG. 6 is a partial sectional view showing the coffee dispensing facility of FIG. 2 in accordance with certain principles of the invention.

As shown in FIGS. 6, 7, 9 and 10, a switch-actuator slide bar 112 is mounted in a slideway 114 formed in the lower housing 32. The slideway 114 is formed with a slanted, upper opening 116 in an offset rear wall 118 of a recess 120 formed in the upper front wall 46. The slide bar 112 (FIG. 10) is formed with a slanted head 122 at an upper end thereof, and with structure complementary to the wall structure of the slideway 114 extending from the upper end to a lower end 124 thereof. As further shown in FIGS. 6 and 7, a tab 126 is formed with, and extends laterally from, the lower end 124 of the slide bar 112 and is in engagement with an actuator arm 128 of an electrical switch 130, which precludes operation of the coffeemaker 30 in the event the carafe 64 is not in place to receive the brewed coffee beverage. The spring biasing action normally provided by the switch 130 on the actuator arm 128, to hold the switch in a non-actuated state, is sufficient to retain the slide bar 112 in the raised position as illustrated in FIG. 6.

Referring to FIGS. 11, 12, 13 and 14, a cradle-like actuator 132 is formed generally in an "L" shaped configuration, as viewed from the side thereof. The actuator 132 is formed in an interior portion thereof with a concave belly section 134, a front opening 136, a three-sided brew-through portal 138 and a pair of spaced side walls 140 and 142. An upper section of the concave belly section 134 blends with a lower end of a rear wall section 144 at a juncture therebetween. Spaced side walls 146 and 148 are formed on opposite sides of the rear wall section 144 and blend with the spaced side walls 140 and 142, respectively. A slightly overhanging upper wall section 150, formed with a forward outboard edge 151, extends upward and outward from a juncture thereof with the rear wall section 144. A pair of pivot pins 152 and 154 extend outward, and in axial alignment, from the side walls 146 and 148, generally in line with the juncture of the wall sections 144 and 150.

A spout-sensing paddle 156 is formed with, and extends angularly downward and away from, a convex section 158 of the actuator 132, the convex section being the exterior of the area of the juncture between the concave belly section 134 and the rear of the wall section 144. An actuator blade 160 is formed outward from the paddle 156 and the convex section 158, and is formed with a slightly convex, cam-actuator surface 162.

Figure 12:
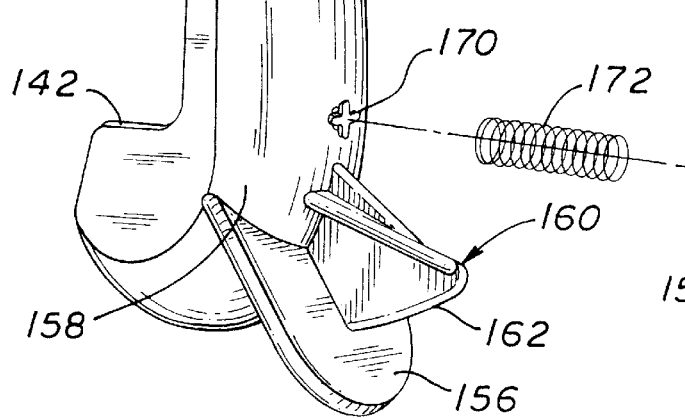
FIG. 12 is a perspective view showing the rear and a side of the cradle actuator of FIG. 8 in accordance with certain principles of the invention.
Figure 13:
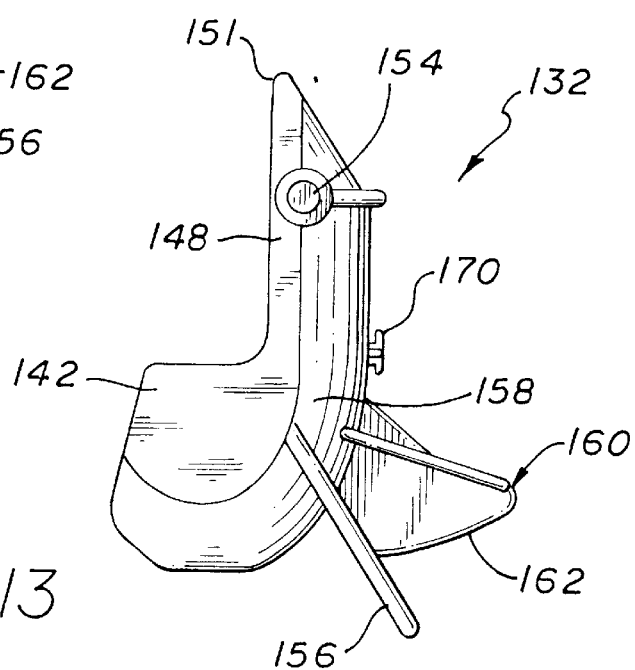
FIG. 13 is a side view showing the cradle actuator of FIG. 8 in accordance with certain principles of the invention.

Referring again to FIG. 9, a pair of spaced pin-receptor notches 164 and 166 are formed in oppositely spaced locations in the upper front wall 46, and in communication with the recess 120. Also, a spring locator 168 is formed on the rear wall 118 of the recess 120 of the upper housing 34, and, as shown in FIGS. 12 and 13, a spring locator 170 is formed on a rear wall of the actuator 132 just above the actuator blade 160. Opposite ends of a spring 172 are placed over the spring locators 168 and 170 and, at the same time, the pins 152 and 154 of the actuator 132 are positioned in the receptor notches 164 and 166 into the position shown in FIGS. 6 and 8.

Figure 5:
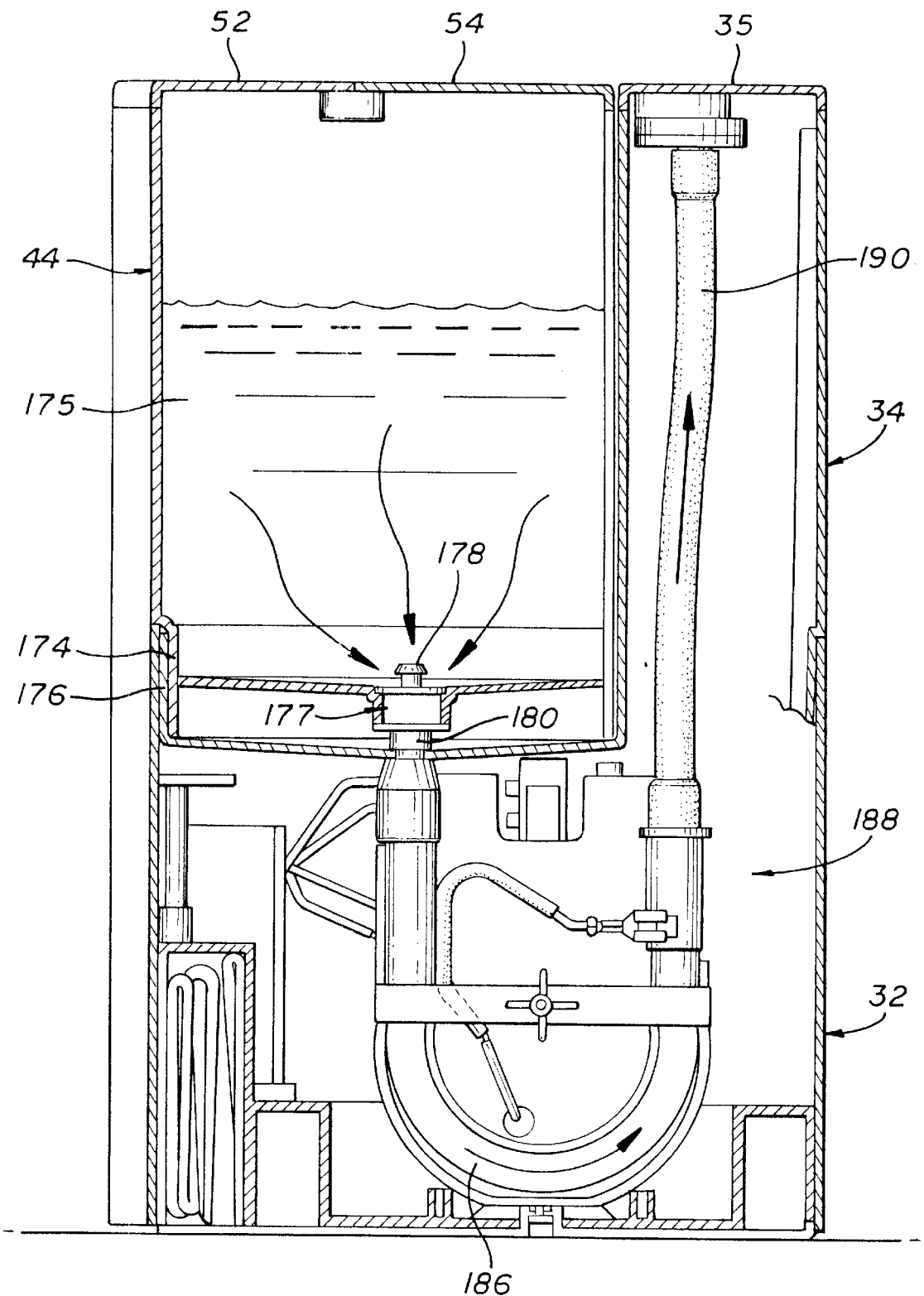
FIG. 5 is a sectional view of the water reservoir of FIG. 2 and water feed and heating system.

Referring to FIGS. 2 and 5, the water reservoir 44 is removable from assembly with the other components of the coffeemaker 30 for selected reasons such as, for example, filling the reservoir with water in preparation for a coffee-beverage making process, or for cleaning purposes. The reservoir 44 is formed at a lower portion thereof with a recessed wall 174 on the rear (not shown) and one side thereof which fits into a well 176 formed in the upper portion of the lower housing 32. When the reservoir 44 is removed from the well 176, a sealing valve 177, including a spring-biased valve rod 178, which is located centrally in the bottom of the reservoir, is normally biased into a sealing position to seal, or close, an opening at the bottom of the reservoir. While in the sealed condition, the lid 54 may be opened and water deposited into, and retained in, the reservoir 44. The user can observe the sight window 48 during the filling of the reservoir 44 and, by use of gradations on the window and a floating ball within the window, can insure that the water in the reservoir is at a level sufficient for making a desired number of cups of the coffee beverage.

As shown in FIG. 2, a rigid tube 180 is formed in the base of the well 176, and extends upward therefrom. When the water-containing reservoir 44 is reassembled with the other components of the coffeemaker 30, the sealed opening at the bottom of the reservoir is positioned over and about the rigid tube 180. The rigid tube 180 pushes the valve rod 178 upward against the biased sealing action of the spring to thereby remove the seal from the opening and allow the water to flow from the reservoir and through the opening. Referring to FIG. 2, a back exterior wall 182 is formed with a catch 184 which mates with a catch (not shown) formed on an upper rear wall of the upper housing 34 when the reservoir is assembled with the other components of the coffeemaker 30.

Referring to FIG. 5, the water flows from the reservoir 44 and into a conduit 186 of a heating system 188 located in the lower housing 32, where the water passing therethrough is heated. The heated water then flows upward through a conduit 190 located in the upper housing 34. As shown in FIG. 4, the heated water flows from the conduit 190 into a spreader 192 located within a shell 194 formed by the top cover 56 and a bottom wall 196. The spreader 192 includes a disc 198 formed with a plurality of small apertures 200 for dispersing the heated water into the filter 78 and through the coffee 84 therein during the process of brewing the coffee beverage.

Referring to FIG. 18, the latch unit 62 includes a catch 202 which is formed on a side wall 204 of the bottom wall 196, and beneath an overhanging undersurface 206 of the top cover 56. The catch 202 is formed with an upper wall 208, opposite side walls 210 and 212 and inwardly turned, spaced, bottom walls 214 and 216 which form a space 218 therebetween. The upper wall 208 is spaced from the side wall 204, and is formed with a notch 220 along a central portion of a rear section thereof.

As shown in FIG. 21, the latch unit 62 further includes a vertically-mounted latch bar 222 having a lower portion mounted within a housing 224, which is formed on an inner wall of the holder 58, and a short upper portion which extends upward and outward from an upper opening 226 of the housing. A horizontal extension 228 is formed from a side wall 230 of the latch bar 222, and extends outward through an opening 232 in the holder 58. The opening 232 is formed with an upper wall surface 234. A portion of the extension 228 is located outside of the holder 58, and is formed with downward turned side walls 236 and 238 (FIG. 1) and a front wall 240.

A shelf 242 is formed outward from an exterior side wall of the holder 58 and is located adjacent a lower end of the opening 232 therein. A spring 244 is located between the upper surface of the shelf 242 and a spring-insert notch formed in an undersurface of the extension 228. A compliant pad 246 is assembled on top of the outwardly extending portion of the extension 228 to provide a user-friendly surface.

The latch unit 162 is in the latched position as shown in FIG. 19. In this position, the spring 244 is urging the extension 228 upward against the upper wall surface 234 of the opening 232, whereby the upper portion of the latch bar 222 is within the notch 220 of the catch 202. Under these conditions, the brew basket holder 58 is removably secured to the top cover 56 and the bottom wall 196. Referring to FIG. 20, when the user desires to swing the holder 58 from under the top cover 56 to the position shown in FIGS. 2 and 24, the user depresses, or pinches, the pad 246 to push the extension 228 downward against the biasing action of the spring 244. With this maneuver, the upper portion of the latch bar 222 is moved downward to the position illustrated in FIG. 20, whereby the latch bar is moved below the notch 220. While holding the latch bar 222 in the unlatched position of FIG. 20, the holder 58 can be swung laterally outward as shown in FIG. 21 to the position shown in FIGS. 2 and 24.

Figure 22:
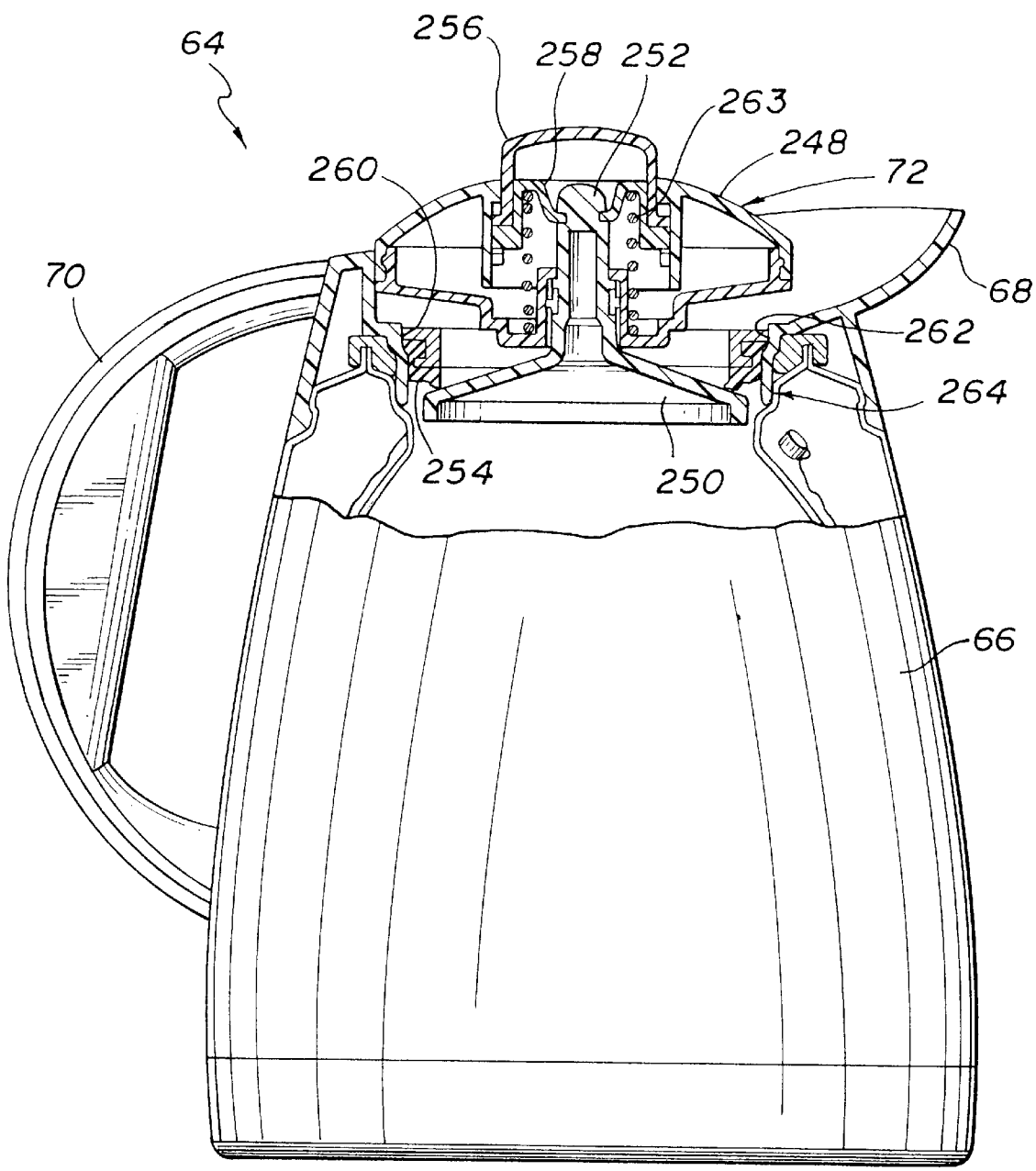
FIG. 22 is partial sectional view of the carafe of FIG. 1 showing details of a push-to-pour lid in a sealed position.
Figure 23:
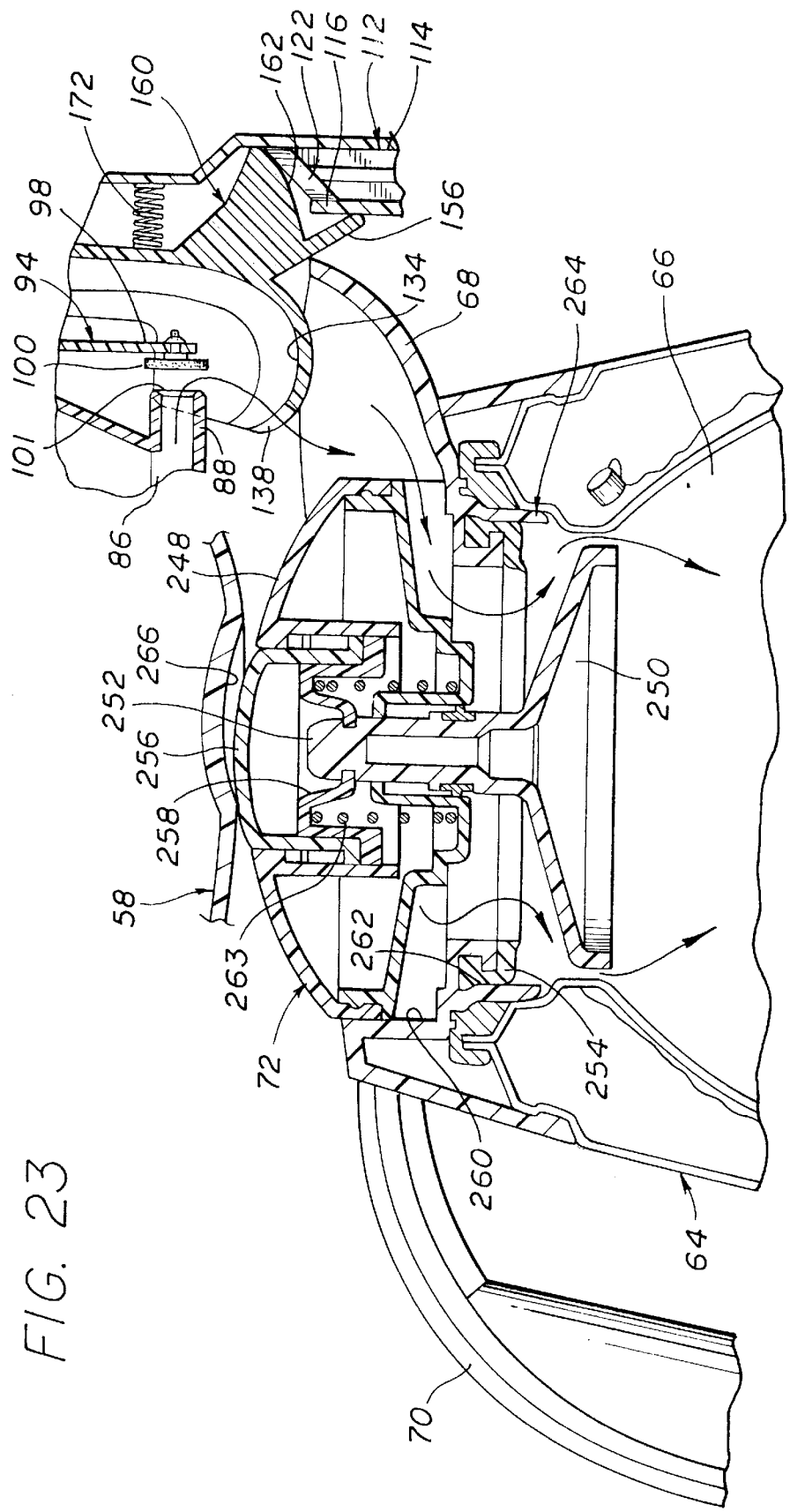
FIG. 23 is a partial sectional view showing the push-to-pour lid of FIG. 22 in an open or unsealed position.

The carafe 64, as illustrated in FIGS. 22 and 23, is disclosed in a copending application for patent filed in the United States Patent and Trademark Office on even date herewith, which is identified by U.S. Ser. No. 09/058,246 (attorney docket number P-US-BP-0342). This application and the above-noted copending application are assigned to a common assignee, HP Intellectual Corp. The disclosure of the copending application identified above is incorporated herein by reference thereto.

Referring to FIG. 22, the lid 72 of the carafe 64 includes a two-piece body 248, a dish-shaped sealing member 250 with a stem 252 extending into a bottom opening of the body, a seal 254, a push button 256 and a spring-biased cam 258 operated by the button. The lid 72 fits into an opening 260 of the carafe 64 where the seal 254 engages a rim surface 262 of an inner rim member 264, which defines the opening 260. The lid 72 is locked in this position by rotation of the lid whereby wings (not shown) formed on the side of the body 248 glide under locking ribs (not shown) extending radially inward from the inner rim member 264.

In the position illustrated in FIG. 22, the sealing member 250 is pressing against the underside of the seal 254 to preclude the dispensing of the beverage from, or the flow of the beverage into, the carafe 64. Referring to FIG. 23, to facilitate the dispensing of the beverage from, or flow of the beverage into, the container 66, the button 256 is depressed whereby the cam 258 is operated to lower the sealing member 250 away from the seal 254 and to lock the sealing member in the open position. The beverage can now flow through an opening 262 formed in the lid 72 and into the spout 68 for eventual dispensing of the beverage from the carafe 64. The button 256 is again depressed to reseal the lid 72 whereby the cam 258 is released and the button returns to the raised, closed position by action of a spring 263. The lid 72 can be operated in the same manner to facilitate the flow of the brewed beverage through the spout 68 and into the container 66.

When the carafe 64 is placed in position within the coffeemaker 30 as shown in FIG. 1, the lid 72 of the carafe is moved under the bottom of the holder 58 as illustrated in FIG. 23. The push button 256 nests in a concave dimple 266 formed in the undersurface of the holder, whereby the button is depressed to open the lid 72 in the manner described above. In this condition, the brewed coffee beverage can flow into the spout 68 and into the container 66.

Figure 24:
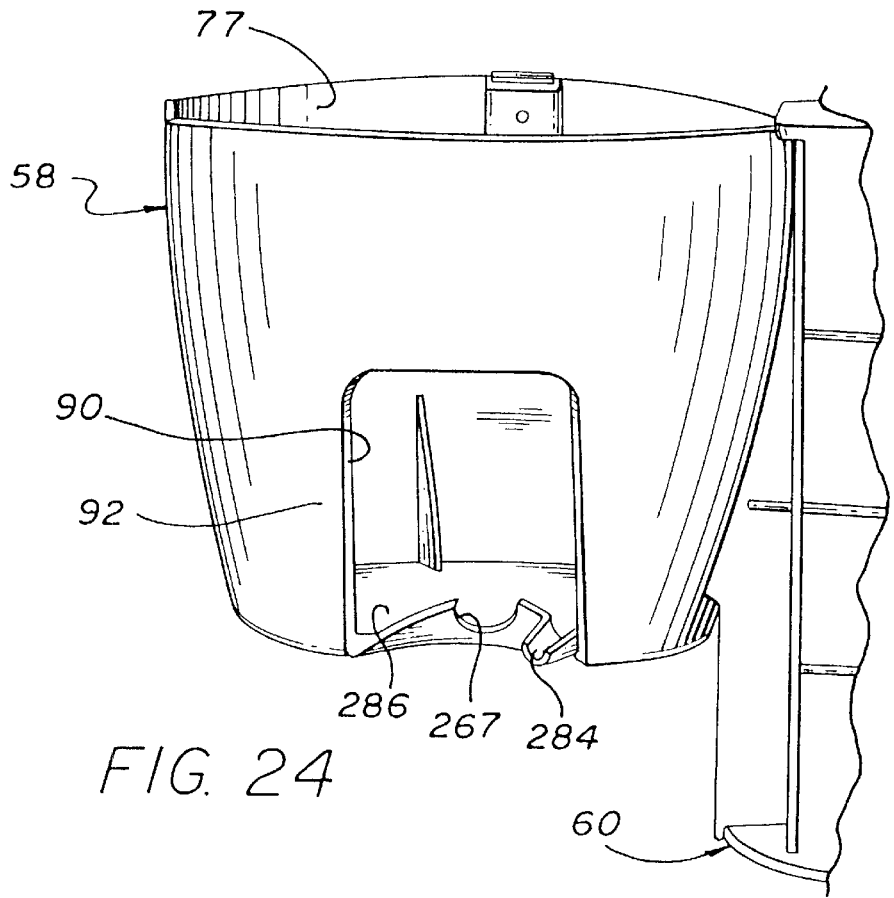
FIG. 24 is a rear view of the brew basket holder of FIG. 4 in an open position showing an excess drainage spout in accordance with certain principles of the invention.

In preparation for using the coffeemaker 30, the carafe 64 is removed from the coffeemaker, and the latch unit 62 is operated to release the holder 58 which is then swung outward to the open position as shown in FIGS. 2 and 24. The brew basket 76 and the filter 78 are removed from the holder 58 for placement of the ground coffee 84 into the filter, and then the basket and filter are returned to the holder. A circular exterior of the trough 86 and the tubular outlet 88 of the brew basket 78 seats in a circular nest 267 formed at the base of the holder 58, as illustrated in FIG. 24, to properly locate and support the basket. The holder 58 is then swung into the latched position as shown in FIGS. 1 and 4.

The water reservoir 44 is removed from its position in the coffeemaker 30 as shown in FIG. 2, and water is deposited therein through the opening provided by lifting the lid 54. When the desired level of water is deposited into the reservoir 44, the lid 54 is closed and the reservoir is returned to its position on the coffeemaker 30. As the reservoir 44 is pushed down into the well 176 (FIG. 5), the rigid tube 180 pushes the valve rod 178 upward to open the sealing valve 177 to allow the water to flow from the reservoir and into the heating system 188. As the reservoir 44 is positioned into the well 176, the reservoir is pushed rearward until it locks in place by use of the catch 184 (FIG. 2) and its complementary catch formed on the upper rear wall of the upper housing 34.

Figure 7:
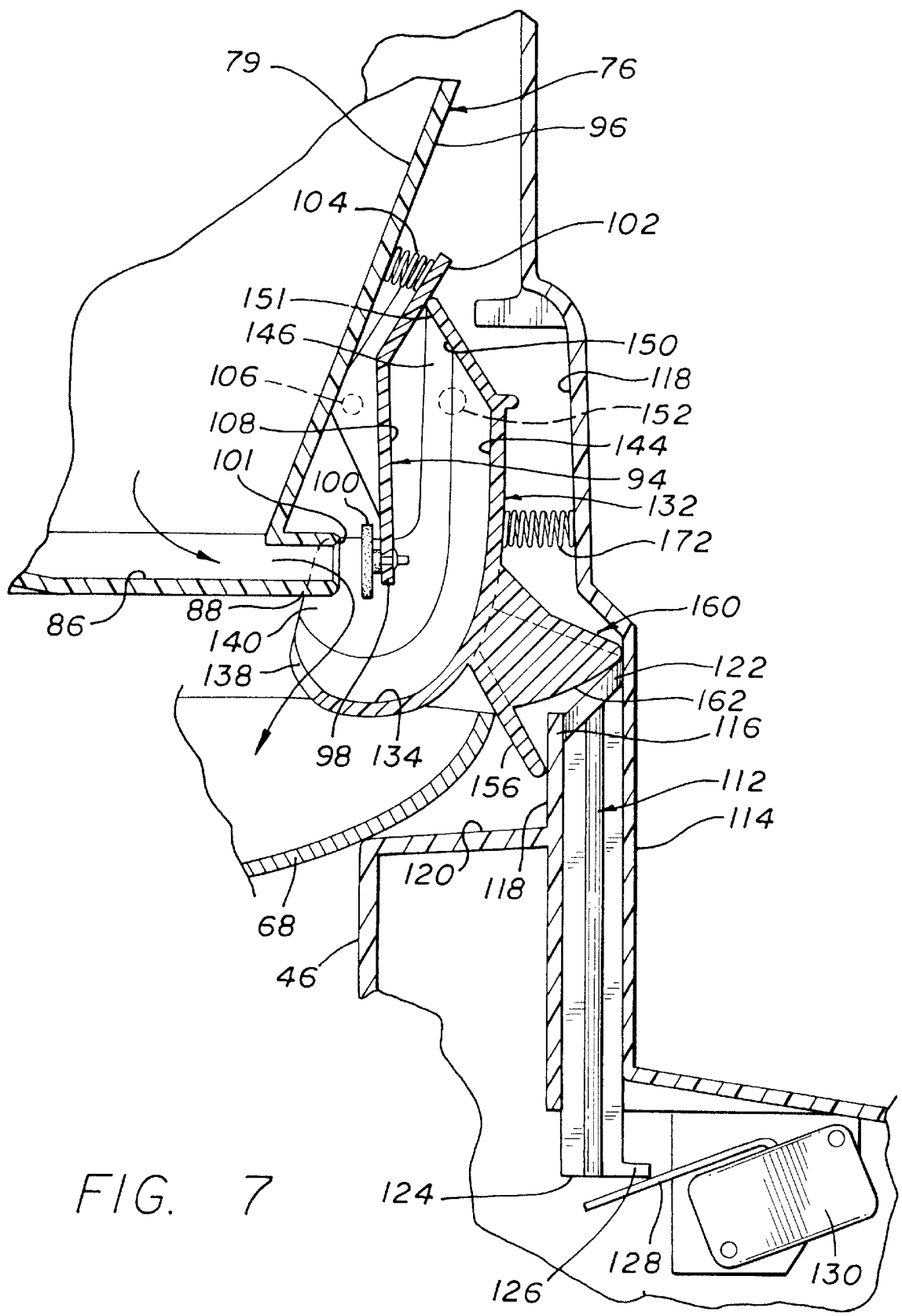
FIG. 7 is a sectional view showing the coffee dispensing facility of FIG. 2 with a pouring spout of the carafe in a dispensing-actuating position in accordance with certain principles of the invention.
Figure 11:
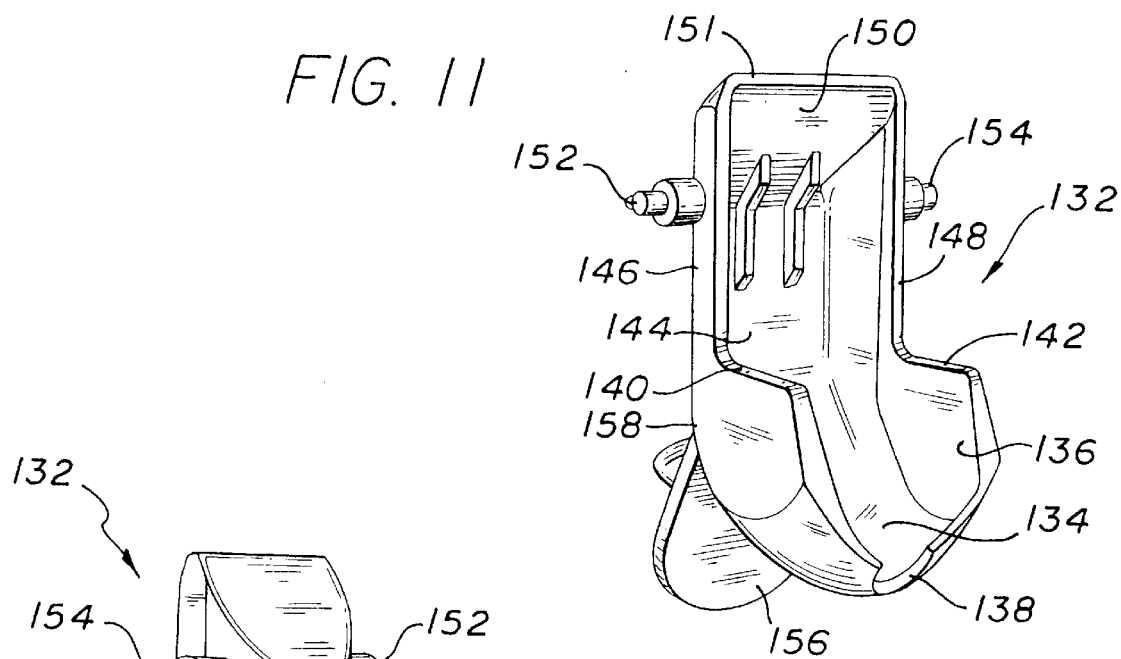
FIG. 11 is a perspective view showing the front and a side of the cradle actuator of FIG. 8 in accordance with certain principles of the invention.

The carafe 64 is then assembled with the coffeemaker 30 as shown in FIGS. 1 and 3. As shown in FIGS. 4, 7 and 23, the button 256 of the carafe lid 72 is depressed as described above to open a path through the spout 68 and into the container 66 for the brewed beverage. In addition, the spout 68 engages and pushes the paddle 156, against the biasing action of the spring 172, to pivot the cradle actuator 132 to the position illustrated. As the actuator 132 is pivoted, the cam-actuator surface 162 engages the slanted head 122 and pushes the slide bar 112 downward, whereby the electric switch 130 is actuated. The switch 130 is in circuit with a main control switch (not shown) which is actuated by the control of the user. In the event the carafe 64 is not in place in the coffeemaker 30, and the user actuates the main control switch, the coffeemaker will not operate because the switch 130 is open.

As the cradle actuator 132 is pivoted to actuate the switch 130, the forward outboard edge 151 of the upper wall section 150 of the actuator engages and pivots the lever 94 against the biasing action of the spring 104. As the lever 94 id pivoted, the stopper 100 is moved away from sealing engagement with the open end 101 of the tubular outlet 88.

Figure 25:
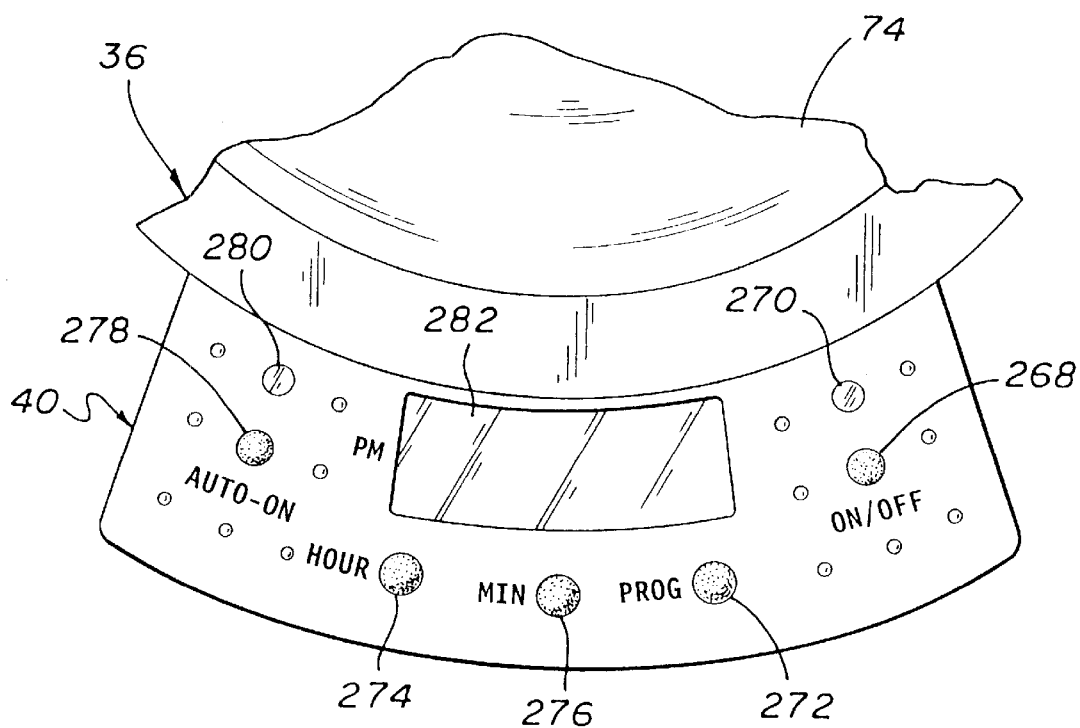
FIG. 25 is a top view showing a control panel of the coffeemaker for user-control of the operation of the coffeemaker of FIG. 1.

The user can now program the coffeemaker 30 to operate in a selected manner. For example, referring to FIG. 25, the user can depress an "ON/OFF" button 268 and a red light 270 will illuminate. When the red light 270 goes out, the brewing cycle is complete. The user could also prepare the coffeemaker 30 for automatic operation at a future time by initially depressing a "PROG" button 272 and then depressing a "HOUR" button 274 and a "MINUTE" button 276 to select the desired start time for the brewing cycle. Thereafter an "AUTO ON" pad 278 is depressed whereby a green light 280 is illuminated momentarily to indicate that the coffeemaker 30 has been set for automatic operation. When the selected advance time is reached, the coffeemaker 30 will begin operation in the manner described above with respect to depression of the "ON/OFF" button 268, and notification by the red light 270. Current time can be set by selectively depressing the "HOUR" and "MINUTE" buttons 274 and 276, until the current time appears in a window 282.

When the beverage-filled carafe 64 is removed from the coffeemaker 30, the cradle actuator 132 returns to the position shown in FIG. 6 whereby the upper wall section 150 engages a bumper arm 284. At the same time, the stopper 100 seals the open end 101 of the tubular outlet 88 to stop the flow of the brewed beverage from the brew basket 76. In the event a few drops of the beverage occurs when the stopper 100 is being moved into sealing engagement with the outlet 88, the drops will fall into the belly section 134 of the actuator 132. In this mode, the cradle actuator 132 is functioning as a drip collector. It is noted that, as shown in FIG. 6, the cradle actuator 132 has been pivoted to a position whereby the beverage-flow portal 138 has been raised above a beverage-drip-collection level of the belly section 134. Thus, the pivotability of the actuator 132 allows the brewed beverage to flow through the portal 138 during the brewing cycle, and allows the belly section 134 to be positioned to collect any beverage drops during and after removal of the carafe from the coffeemaker 30. As shown in FIG. 24, a trough-like spout 284 is formed at the base of the holder 58 adjacent the nest 267. If any brewed beverage should reach a base floor 286 of the holder 58, the beverage will flow through the spout 284 into the spout 68 of the carafe 64, or the belly section 134 of the actuator 132 in the absence of the carafe.

In general, the above-identified embodiments are not to be construed as limiting the breadth of the present invention. Modifications, and other alternative constructions, will be apparent which are within the spirit and scope of the invention as defined in the appended claims.

What is claimed is:

1. A coffeemaker, which comprises:

a housing including a first portion defining a brew basket receiving opening;

a nest extending from the housing for supporting a carafe positionable therein;

a brew basket removably mounted within the opening of the first portion of the housing and formed with an outlet for directing the outbound flow of a beverage therefrom;

a drip collector attached to the housing and responsive to the absence of the carafe in the nest for collecting drops of the beverage which may pass through the outlet during the absence of the carafe in the nest; and the drip collector responsive to the presence of the carafe in the nest for positioning thereof to allow the beverage flowing from the outlet to flow to the carafe.

2. The coffeemaker as set forth in claim 1, which further comprises:

an actuator contained within the housing;

a switch contained within the housing for facilitating operation of the coffeemaker;

the actuator being responsive to the presence of the carafe in the nest for closing the switch.

3. The coffeemaker as set forth in claim 2, wherein the drip collector and the actuator are formed as a single element.

4. The coffeemaker as set forth in claim 1, which further comprises:

an actuator contained within the housing;

a lever having a seal attached thereto and positioned to normally apply the seal to the outlet of the brew basket to cover the outlet and prevent the flow of beverage therefrom;

the actuator being responsive to the presence of the carafe in the nest for moving the lever to withdraw the seal from the outlet and allow the beverage to flow from the brew basket to the carafe.

5. The coffeemaker as set forth in claim 4, which further comprises:

a switch contained within the housing for facilitating operation of the coffeemaker;

the actuator being responsive to the presence of the carafe in the nest for closing the switch.

6. The coffeemaker as set forth in claim 5, wherein the drip collector and the actuator are formed as a single element.

7. The coffeemaker as set forth in claim 1, which further comprises:

the housing having an extension extending therefrom;

a brew basket holder attached movably to the housing and movable between a first position adjacent the extension and a second position spaced from the extension;

a catch formed on the extension: and a biased latch bar attached to the holder and positioned for latching engagement with the catch when the holder is moved to the first position to retain the holder with the extension.

8. The coffeemaker as set forth in claim 1, which further comprises:

a spring located between the drip collector and the housing for normally urging the drip collector into a position for collecting the drops of the beverage;

the drip collector being attached to the housing for movement relative thereto; and the drip collector being located for engagement with, and movement by, the carafe when the carafe is placed in the nest to allow the beverage to flow from the outlet to the carafe.

9. The coffeemaker as set forth in claim 1, which further comprises:

the drip collector being formed with a belly section which serves as a depository for the drops of the beverage; and the belly section being movable into position to collect the drops of beverage in the absence of the carafe in the nest.

10. The coffeemaker as set forth in claim 9, which further comprises:

a portal formed in the drip collector adjacent the belly section which, when the drip collector is moved in response to the carafe being placed in the nest, is positioned to direct the beverage from the outlet to the carafe.

11. The coffeemaker as set forth in claim 4, which further comprises:

the lever being attached to the brew basket for pivotal movement relative thereto;

the seal being attached to a first end of the lever;

the lever being formed with a second end spaced from the first end; and a spring located between the brew basket and the second end of the lever to normally urge the first end of the lever and the seal attached thereto toward the outlet of the brew basket to seal the outlet.

12. A coffeemaker, which comprises;

a housing;

a nest extending from the housing for supporting a carafe positionable therein;

an actuator contained within the housing and mounted for pivotal movement relative to the housing;

a sensing paddle extending from the actuator;

a spring located between a portion of the actuator and the housing;

the actuator being normally biased by the spring in such a manner that the sensing paddle is normally located in a space occupied by the carafe when the carafe is located in the nest;

a switch located within the housing for facilitating the operation of the coffeemaker;

a slide bar located within the housing normally biased to a rest position at which the switch is deactuated;

an actuating surface formed on the actuator and positioned for engagement with the slide bar;

the actuator being moved upon positioning of the carafe into the nest to move the actuating surface into moving engagement with the slide bar and thereby actuate the switch;

the lever having a seal attached thereto and positioned to normally apply the seal to the outlet of the brew basket to cover the outlet and prevent the flow of beverage therefrom;

the actuator being responsive to the presence of the carafe in the nest for moving the lever to withdraw the seal from the outlet and allow the beverage to flow from the brew basket to the carafe;

a brew basket attached to the housing and formed with an outlet for directing the outbound flow of a beverage therefrom;

the lever being attached to the brew basket for pivotal movement relative thereto;

the seal being attached to a first end of the lever;

the lever being formed with a second end spaced from the first end;

a spring located between the brew basket and the second end of the lever to normally urge the first end of the lever and the seal attached thereto toward the outlet of the brew basket to seal the outlet;

the housing having an extension extending therefrom;

a brew basket holder attached movably to the housing and movable between a first position adjacent to the extension and a second position spaced from the extension;

a catch formed on the extension; and a biased latched bar attached to the holder and positioned for latching engagement with the catch when the holder is moved to the first position to retain the holder with the extension.

13. A coffeemaker, which comprises:

a housing;

a nest extending from the housing for supporting a carafe positionable therein;

a brew basket attached to the housing and formed with an outlet for directing the outbound flow of a beverage therefrom;

an actuator mounted for movement within the housing with a portion thereof biasingly extended into a location normally occupied by the carafe when the carafe is situated in the nest;

a switch located within the housing for facilitating the operation of the coffeemaker;

the actuator being responsive to the presence of the carafe in the nest for closing the switch;

a lever having a seal attached thereto and positioned to normally apply the seal to the outlet of the brew basket to cover the outlet and prevent the flow of beverage therefrom;

the actuator being responsive to the presence of the carafe in the nest for moving the lever to withdraw the seal from the outlet and allow the beverage to flow from the brew basket to the carafe;

the actuator being formed with a drip-collection section which serves as a depository for the drops of the beverage in the absence of the carafe in the nest; and the actuator being movable into position to locate the drip-collection section in a position to collect the drops of beverage in the absence of the carafe in the nest.

14. The coffeemaker as set forth in claim 13, which further comprises:

the housing having an extension extending therefrom;

a brew basket holder attached movably to the housing and movable between a first position adjacent the extension and a second position spaced from the extension;

a catch formed on the extension: and a biased latch bar attached to the holder and positioned for latching engagement with the catch when the holder is moved to the first position to retain the holder with the extension.

15. A coffeemaker, which comprises:

a housing;

a nest extending from the housing for supporting therein a carafe having a spout;

a brew basket attached to the housing and formed with an outlet for directing the outbound flow of a beverage therefrom;

an actuator mounted for movement within the housing with a portion thereof biasingly extended into a location normally occupied by the carafe when the carafe is situated in the nest;

a portal formed in the actuator which, when the actuator is moved in response to the carafe being placed in the nest, is positioned to direct the beverage from the outlet into the spout of the carafe.

16. The coffeemaker as set forth in claim 15, which further comprises:

means responsive to the removal of the carafe from the nest for moving the actuator to move the portal away from the outlet of the brew basket.

* * * * *